US012279341B2

United States Patent
Borsoi et al.

(10) Patent No.: US 12,279,341 B2
(45) Date of Patent: Apr. 15, 2025

(54) METHOD FOR HEATING A TANK

(71) Applicant: VITESCO TECHNOLOGIES GMBH, Hanover (DE)

(72) Inventors: Sonny Borsoi, Toulouse (FR); Sorour Bahja, Toulouse (FR)

(73) Assignee: VITESCO TECHNOLOGIES GMBH, Hannover (DE)

( * ) Notice: Subject to any disclaimer, the term of this patent is extended or adjusted under 35 U.S.C. 154(b) by 849 days.

(21) Appl. No.: 17/427,558

(22) PCT Filed: Jan. 31, 2020

(86) PCT No.: PCT/EP2020/052412
§ 371 (c)(1),
(2) Date: Jan. 31, 2022

(87) PCT Pub. No.: WO2020/157270
PCT Pub. Date: Aug. 6, 2020

(65) Prior Publication Data
US 2023/0189400 A1 Jun. 15, 2023

(30) Foreign Application Priority Data
Jan. 31, 2019 (FR) ...................... 1900939

(51) Int. Cl.
*H05B 1/02* (2006.01)
*F01N 11/00* (2006.01)
*F02M 31/125* (2006.01)

(52) U.S. Cl.
CPC ........... *H05B 1/0236* (2013.01); *F01N 11/00* (2013.01); *F02M 31/125* (2013.01);
(Continued)

(58) Field of Classification Search
CPC ................ H05B 1/0236; H05B 1/0244; H05B 2203/02; F01N 11/00; F01N 3/2066;
(Continued)

(56) References Cited

U.S. PATENT DOCUMENTS

2009/0272727 A1 11/2009 Han
2011/0240630 A1\* 10/2011 Etorre .................. H05B 1/0236
219/482
(Continued)

FOREIGN PATENT DOCUMENTS

CN 105757968 A 7/2016
DE 102008056757 6/2009
(Continued)

OTHER PUBLICATIONS

Chinese Office Action dated Oct. 20, 2023.
(Continued)

*Primary Examiner* — Grant Moubry
(74) *Attorney, Agent, or Firm* — NIXON & VANDERHYE

(57) ABSTRACT

Disclosed is a method for heating liquid in a tank, including: providing at least one heating element of PTC type; providing a pulse width modulation regulator; measuring parameters including the temperature of the liquid and the voltage applied across the terminals of each heating element; heating the liquid without regulation, insofar as the temperature of the liquid is below a first threshold temperature; applying pulse width modulation regulation to the electrical supply to each heating element for which the supply voltage exceeds a predetermined threshold insofar as a measured temperature is above a second threshold temperature determined as a function of measured parameters; and determining a duty cycle for the modulation of the electrical supply to each heating element and transitioning progressively from a duty cycle of 1 to the determined duty cycle.

20 Claims, 3 Drawing Sheets

(52) U.S. Cl.
CPC ........ *H05B 1/0244* (2013.01); *F01N 2610/02* (2013.01); *F01N 2610/105* (2013.01); *F01N 2610/1486* (2013.01); *F01N 2900/1811* (2013.01); *F01N 2900/1814* (2013.01); *H05B 2203/02* (2013.01)

(58) Field of Classification Search
CPC ........... F01N 2610/02; F01N 2610/105; F01N 2610/1486; F01N 2610/10; F01N 2900/1811; F01N 2900/1814; F02M 31/125; Y02A 50/20; Y02T 10/12
See application file for complete search history.

(56) References Cited

U.S. PATENT DOCUMENTS

| | | | |
|---|---|---|---|
| 2014/0208719 A1* | 7/2014 | Naydenov | ............. F01N 3/2066 60/303 |
| 2015/0158366 A1 | 6/2015 | Lee | |
| 2017/0290094 A1 | 10/2017 | Ma | |
| 2018/0325182 A1 | 11/2018 | Zitzke et al. | |

FOREIGN PATENT DOCUMENTS

| | | | | |
|---|---|---|---|---|
| DE | 102011002902 A1 | * | 7/2012 | ............. F01N 3/208 |
| DE | 202013010565 U1 | * | 12/2014 | ........... H05B 1/0244 |
| EP | 2 217 034 | | 7/2015 | |
| WO | 2016/096712 | | 6/2016 | |
| WO | WO-2017001367 A1 | * | 1/2017 | ........ A47J 27/21016 |

OTHER PUBLICATIONS

International Search Report for PCT/EP2020/052412 dated Feb. 26, 2020, 5 pages.
Written Opinion of the ISA for PCT/EP2020/052412 dated Feb. 26, 2020, 5 pages.

* cited by examiner

|  | -11°C | 0°C | 20°C |
|---|---|---|---|
| 5 mm | 12 | 20 | 25 |
| 15 mm | 20 | 31 | 35 |
| 25 mm | 42 | 47 | 50 |
| 35 mm | 55 | 60 | 63 |
| 45 mm | 63 | 65 | 69 |
| 55 mm | 67 | 69 | 73 |
| 65 mm | 69 | 73 | 76 |
| 75 mm | 71 | 76 | 79 |
| 85 mm | 73 | 78 | 82 |
| 95 mm | 73 | 80 | 83 |
| 105 mm | 74 | 81 | 84 |
| 115 mm | 74 | 82 | 85 |
| 125 mm | 74 | 82 | 85 |
| 135 mm | 74 | 82 | 85 |
| 145 mm | 74 | 82 | 85 |
| 155 mm | 74 | 82 | 85 |

FIG. 4

| -8°C | 10 mm | 55 mm | 130 mm |
|---|---|---|---|
| 9V | 100 | 100 | 100 |
| 13.8V | 67 | 78 | 98 |
| 16V | 12 | 33 | 73 |
| 0°C |  |  |  |
| 9V | 100 | 100 | 100 |
| 13.8V | 35 | 73 | 95 |
| 16V | 20 | 27 | 73 |
| 20°C |  |  |  |
| 9V | 93 | 100 | 100 |
| 13.8V | 15 | 60 | 86 |
| 16V | 8 | 36 | 69 |

FIG. 5

METHOD FOR HEATING A TANK

CROSS-REFERENCE TO RELATED APPLICATIONS

This application is the U.S. national phase of International Application No. PCT/EP2020/052412 filed Jan. 31, 2020 which designated the U.S. and claims priority to French Application No. 1900939 filed Jan. 31, 2019, the entire contents of each of which are hereby incorporated by reference.

BACKGROUND OF THE INVENTION

Field of the Invention

The invention relates to a method for heating a tank, notably a tank on board a vehicle and more particularly a motor vehicle (an automobile, a truck, etc.).

In order to meet pollution control standards, certain vehicles carry an on-board tank of additional liquid, other than the fuel. This may be water or else a urea-based solution. These liquids may freeze in the winter time and they then need to be warmed up so that they can be used.

Description of the Related Art

It is known practice to equip a tank at the risk of freezing with heating means usually in the form of resistive electrical elements. In the given example in the automotive field of a tank intended to contain an aqueous solution with urea (or else water), the lower wall of the tank usually comprises a housing forming a boss toward the inside of the tank and this housing houses, inside the boss (which is to say on the outside of the tank), firstly a pump for handling the delivery of the solution to, for example, a selective catalytic reduction (better known by its abbreviation SCR) system, and secondly, resistive electrical elements for heating the lower wall of the tank in the region of the housing and thus unfreezing the liquid.

Furthermore, the use of heating elements of the PTC (Positive Temperature Coefficient) type in which the resistance of the elements increases with temperature, is also known. Because the resistance increases, the strength of the current passing through the element decreases and self-regulation of the temperature of this heating element is thus obtained.

It is also known practice to regulate the temperature of a PTC heating element using pulse width modulation (PWM). However, such regulation is theoretically used in the automotive field only for regulating the temperature of an airflow.

The conditions involved in heating a liquid are entirely different than those of heating an airflow. First of all, the heating element cannot be positioned directly in the liquid as it can in an airflow. Next, in order to heat a liquid in a tank it is necessary to take account of parameters such as the level of liquid in the tank, the temperature of this liquid, the heating area in contact with the liquid, and also such as the supply voltage of the heating element. The regulated temperature of a heating element of PTC type may vary from 50° C. to 120° C. depending on these parameters.

It is therefore appropriate to avoid reaching excessively high temperatures which, on the one hand, could cause the heated liquid to boil and, on the other hand, could lead to damage to certain surrounding materials (for example components made of synthetic materials intended to provide sealing).

SUMMARY OF THE INVENTION

It is an object of the present invention therefore to provide a method for heating a liquid in a tank using a heating element of PTC type that avoids overheating leading to boiling of the liquid and/or to damage (or fatigue) of a surrounding material.

As a preference, the method will allow the heating of the tank to be optimized so as to limit the time needed in order for the heated liquid to come up to temperature.

The invention proposes a method for heating liquid in a tank, comprising the following steps:
   providing at least one heating element of PTC type,
   providing pulse width modulation regulating means.
According to the present invention, this method further comprises the steps of:
   measuring parameters including the temperature of the liquid and the voltage applied across the terminals of each heating element,
   heating the liquid without regulation, namely with a duty cycle of 1 or 100% of the pulse width modulation setting, insofar as the temperature of the liquid is below a first threshold temperature,
   applying pulse width modulation regulation to the electrical supply to each heating element for which the supply voltage exceeds a predetermined threshold insofar as a measured temperature is above a second threshold temperature, said second threshold temperature being determined as a function of measured parameters,
   determining a duty cycle for the modulation of the electrical supply to each heating element and transitioning progressively from a duty cycle of 1 to the determined duty cycle.

The method proposed here ensures that temperatures carrying the risk of vaporizing the liquid and/or damaging the components of the tank are not reached. Furthermore, by virtue of the progressive variation in the duty cycle, there is no abrupt variation in the heating power delivered and this means that the efficiency with which the liquid in the tank is heated can be increased.

In the method described above, the heating elements of PTC type are preferably mounted in parallel. Thus, the one same supply voltage is applied across all of the heating elements. The electrical management of the system is therefore simplified.

The first threshold temperature is, for example, predetermined as a function of the nature of the liquid contained in the tank. This threshold temperature is, for example, a temperature at which it is possible to be sure that there is no risk of solidification in the tank. For example, in the case of water, if a temperature measurement at a point in the tank reads +3° C., it may be estimated that there is no ice in the tank (if the tank is at atmospheric pressure of course). This first threshold temperature is thus dependent on the liquid, on its solidification temperature, but also on the calorific properties of this liquid.

In order to implement this method, provision may be made that a liquid level is measured, that the second threshold temperature is determined as a function of the measured liquid level and of the temperature of the liquid, and that the measured temperature compared against the second threshold temperature is a temperature measured downstream of the tank, preferably downstream of a pump that withdraws liquid from the tank. When a pump is used to withdraw liquid from a tank and this tank is heated, the means for heating the tank usually also heat the pump and its surroundings in order to unfreeze all of the hydraulic pipes and allow the pump to operate correctly. In this instance, the temperature chosen to be compared against the second temperature threshold is therefore a good illustration of the heating supplied to the liquid in the tank. In this variant of the method, the second threshold temperature may for example be determined from a two-entry look-up table.

According to a variant of the method described above, a liquid level is measured, and the duty cycle to be attained can then be determined as a function of the voltage applied across the heating element concerned, of the measured liquid level and of the temperature of the liquid, from a look-up table. In this variant, the duty cycle to be attained may itself likewise be determined from a look-up table which in this instance will then be a three-entry look-up table.

As indicated, the duty cycle varies progressively. It decreases from 100% to the determined duty cycle, for example on a gradient comprised between 0.05 and 0.5% $s^{-1}$, for example 0.1%/s.

Another aspect of the invention proposes a computer program containing instructions for implementing each of the steps of the method as described above when this program is executed by a processor.

Finally, the invention further relates to an electronic management device for a motor vehicle engine, characterized in that it comprises a non-transient recording medium on which there is recorded a computer program for implementing each of the steps of a method as described above, when this program is executed by a processor.

BRIEF DESCRIPTION OF THE DRAWINGS

Other features, details and advantages of the invention will become apparent from reading the following detailed description and analyzing the appended drawings, in which:

FIG. 4 shows an example of a two-entry look-up table that can be used for implementing the method illustrated in FIG. 3; and FIG. 5 shows an example of another look-up table, this one being a three-entry look-up table, said table likewise being able to be used for implementing the method illustrated in FIG. 3.

DESCRIPTION OF THE PREFERRED EMBODIMENTS

The attached drawing and the following description contain mostly elements of a certain nature. They can therefore be used not only to better understand the present invention, but also for contributing to the definition thereof, where applicable.

Figure 1:
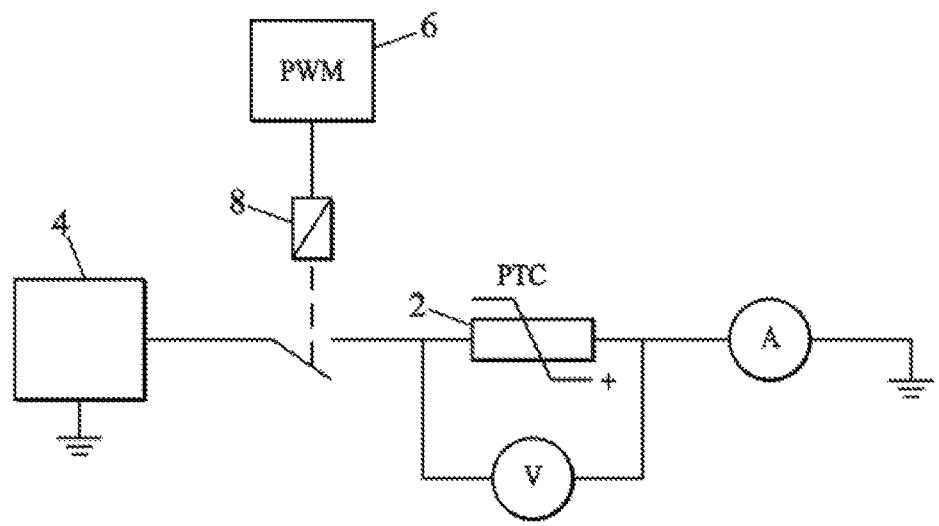
FIG. 1 shows a simplified electrical diagram for a device for heating a tank of liquid.

FIG. 1 illustrates a heating element 2 intended to heat a liquid contained in a tank. Reference is made to document WO2016/096712 for an example of an implementation of such a heating element in a tank. The heating element 2 of the present application may take the place of an element referenced 10 in that prior-art document.

It has been elected here to adopt at least one heating element 2 of PTC (Positive Temperature Coefficient) type. With such an element, the temperature of the heating element is automatically limited because the resistance of the element increases with temperature so that the current passing through the element decreases and thus limits the power dissipated in the heating element.

FIG. 1 illustrates a single heating element 2. However, several heating elements 2 may be provided, firstly in order to increase the heating power, and secondly in order to distribute this heating power across several points. From an electrical standpoint, all these heating elements 2 will therefore be mounted in parallel so that they will all have the same voltage V across their terminals.

The electrical power supply to all the heating elements 2 is provided from a power supply device 4 which incorporates a controller to control whether or not the heating elements 2 are electrically powered.

A pulse width modulation device 6 acts on the power supply to the heating elements 2 via a relay 8. Such a device is also known in its abbreviated form as a PWM (Pulse Width Modulation) device. The pulse width modulation device 6 allows the power transmitted to the heating elements to be limited. The power modulation may range from 0 to 1, or from 0% to 100% of the maximum power transmitted. This ratio will be referred to hereinafter as the duty cycle. When it has value 1 (100%), all of the power available from the power supply device 4 is transmitted to the heating elements 2. Contrastingly, when this duty cycle has value 0 (0%), the heating elements 2 are no longer powered, even if the controller of the power supply device 4 is "closed" (in the analogy with a switch) and is therefore commanding a supply of electrical power to the system.

Figure 2:
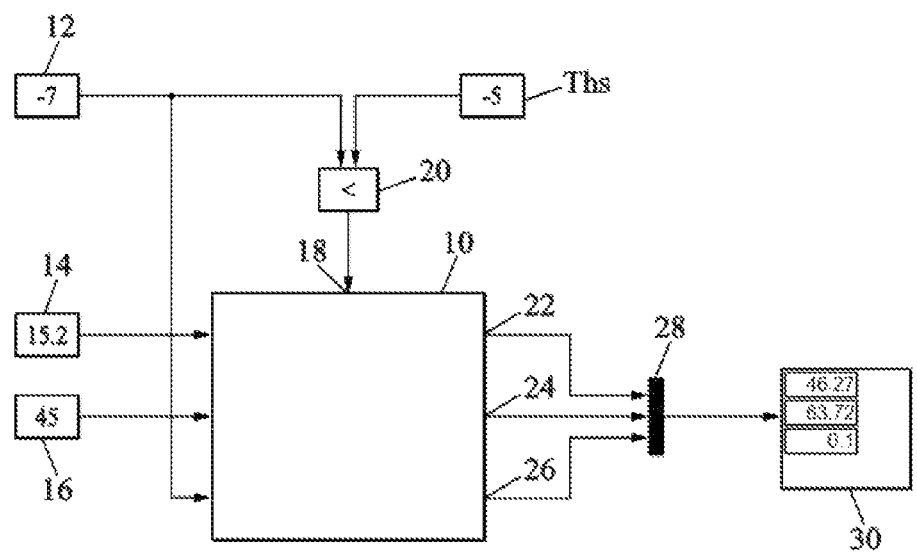
FIG. 2 schematically shows a control unit for a heating device of FIG. 1.

A control unit 10 illustrated in FIG. 2 is used to manage the device of FIG. 1 and notably to manage the controller of the power supply device 4 and the pulse width modulation device. This control unit has four inputs and three outputs.

A first input 12 corresponds for example to the temperature of a liquid that is to be heated Tliq. In the case of an application to a tank of liquid in a motor vehicle, be it for example water, or for example a urea-based solution (namely like in document WO2016/096712), or another liquid, it is routine practice to measure the temperature of this liquid. The information supplied by this temperature sensor (which is not illustrated in the drawing) is supplied on this first input 12.

A second input 14 provides the control unit 10 with the supply voltage V across the terminals of each heating element 2 (which will be the same voltage for each of these elements because they are mounted in parallel). This supply voltage is known in a digital control unit present on any modern-day motor vehicle to allow proper engine management, and is made available on the second input 14.

A third input 16 allows the control unit to know the level L of liquid in the tank. Just as was the case with the temperature of the liquid Tliq, there is already a sensor provided for determining this data item. All of these data are accessible in the engine digital control unit.

A fourth input 18 is intended to receive a binary signal originating from a comparator 20. The latter compares the temperature of the liquid Tliq against a predetermined temperature Ths which is a temperature stored in memory for example in the digital control unit. Ths is dependent on the liquid contained in the tank. For example, if water is contained in the tank, Ths will be fixed at +3° C. for example. It is estimated here that if the temperature of the liquid is above Ths, then there is no risk of the liquid being frozen. If the tank contains a urea-based solution which freezes at −11° C., then Ths will be adapted accordingly. In any case, this value is defined once and for all because one and the same tank is generally not intended to contain a number of different types of liquid.

A first output 22 supplies a control signal, called PWM_DC for controlling the pulse width modulation device 6 in order to indicate to that device the duty cycle according to which it is to operate.

A second output 24 supplies a signal corresponding to a temperature referred to as TPSe_TH, which is a temperature that varies as a function of parameters of the system. This temperature is a setpoint temperature. It is common practice for a pump to be provided in order to draw liquid from the tank and send it to its destination. At least one pressure sensor associated with a temperature sensor for the management of the pump is therefore to be found at this pump. When the temperature measured at these sensors reaches the setpoint temperature, the power modulation is activated.

The third output 26 for its part supplies a variation ratio termed PWM_DC_grad which provides the rate of variation of the duty cycle. This rate of variation is expressed, for example, as a percentage per second.

As illustrated in FIG. 2, the output data are sent to a communication network 28, for example of CAN (or other) type, which transmits data packets 30 destined for receivers such as the liquid heating system concerned here.

Figure 3:
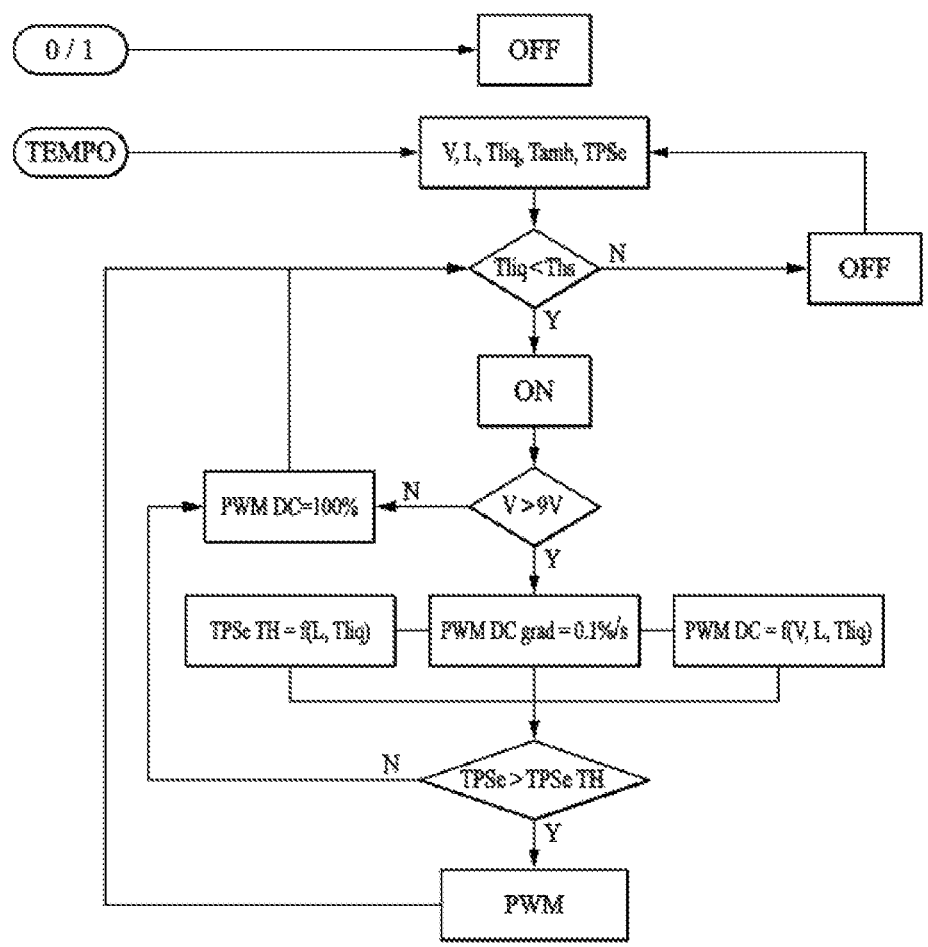
FIG. 3 shows a flow diagram for a method for heating a tank of liquid.

FIG. 3 gives an example of a flow diagram that allows the values to be supplied on the first output 22, the second output 24 and the third output 26 to be determined from the data supplied on the first input 12, the second input 14, the third input 16 and the fourth input 18.

The flow diagram of FIG. 3 is explained hereinafter.

When the engine control and management means are switched on (0/1 box), or in other words when the user switches on the ignition, the heating system remains switched off (OFF box), in order not to consume electricity, as the electricity requirements when starting the engine are generally high.

After a timed delay (TEMPO box), for example of the order of 30 seconds counted from the switching-on or else from the starting of the engine, measurements are taken. A box in the figure illustrates by way of example some of the measurements that may be taken:

V: the voltage across the terminals of the heating elements 2. This voltage is dependent on the charge of the battery powering these elements. It generally varies around 12 V, for example between 9 and 16 V.

L: this is the level of liquid in the tank. It may be a measurement in millimeters (or meters) or else a fill percentage of the tank.

Tliq: this is the temperature of the liquid in the tank.

Tamb: this is the ambient temperature.

TPse: this temperature is measured at the pump that withdraws the liquid from the tank. This pump is usually also heated by the heating elements 2.

Once these measurements have been taken, the temperature Tliq of the liquid in the tank is compared (using the comparator 20) with the temperature Ths stored in memory and dependent on the liquid stored in the tank. If the liquid is not too cold, then there is no risk of freezing (option N) and the system is not activated (OFF box). Measurements are then regularly taken in order to monitor that there is no risk of freezing.

By contrast, if the liquid is cold and its temperature is below Ths (option Y), the liquid may have frozen or be at risk of freezing. The heating system is then switched on (ON box).

With the heating system in operation, the operating conditions need to be determined. On first start-up, the duty cycle at the pulse width modulation device is 100%.

The first check made after starting the heating device is to check the supply voltage V of the heating elements 2. If this voltage is below 9 V, the power available for the heating elements 2 is low and (option N) the duty cycle PWM_DC is kept at 100% in order to have maximum heating with the available power.

By contrast, if the voltage V is "satisfactory", namely greater than 9 V (option Y), then pulse width modulation can be envisioned.

In a novel manner, on the one hand, the modulation begins when a temperature parameter crosses a dynamic threshold, namely a threshold that is determined as a function of parameters that are updated and, on the other hand, the modulation is performed progressively.

In the preferred embodiment described here, it has been elected to begin the modulation of the supply of power to the heating elements 2 when the temperature of the liquid at the pump that withdraws the liquid from the tank, preferably downstream of this pump, crosses a threshold that is to be determined. The measured temperature is referred to as TPSe, whereas the threshold that is to be determined is referred to as TPSe_TH.

The temperature threshold TPSe_TH is thus determined as a function of L and of Tliq. FIG. 4 gives an example of a two-input look-up table that allows TPSe_TH to be determined as a function of these two parameters. The intermediate values can be obtained by extrapolation, for example linear extrapolation. Temperatures higher than Ths are also mentioned for embodiments in which it is anticipated that the heating will be locked in the switched-on position, in order once again to avoid overheating.

Likewise, the duty cycle PWM_DC that is to be attained is also determined. This duty cycle is defined here using:
  the voltage applied to the heating elements 2. The lower this voltage, the higher the duty cycles will be.
  the level of liquid in the tank. Here again, the higher the level, the more energy will therefore be needed to heat the liquid and so the higher the duty cycle will be.
  the temperature of the liquid. For this parameter, the higher the temperature, the less need the liquid has of being heated and so the lower the duty cycle will be.

FIG. 5 gives an example of a three-input look-up table that allows the duty cycle to be attained to be determined. This example, as well as that of FIG. 4, has of course been simplified for illustrative purposes. The system preferably incorporates a look-up table comprising a far greater number of values. Here again, as indicated previously, intermediate values can be deduced by interpolation.

As indicated above, in a novel manner, the modulation transitions progressively from value 1 to value PWM_DC. The rate of variation of the duty cycle, PWM_DC_grad is set at 0.1%/s here. This value gives good results and allows the time taken to obtain the heating of the liquid in the tank to be optimized.

In the embodiment described here, PWM_DC_grad is a constant. This rate of variation could also be parameter-dependent. It could, for example, be dependent on the filling of the tank. The less full the tank, the higher this rate could be. Other parameters could be chosen. However, variations in this rate (around the preferred value given above) do not allow a significant change to the heating time for obtaining the desired temperature of the liquid.

The method indicated hereinabove corresponds to a preferred embodiment of the heating of a liquid in a tank in the field of automobiles. It may be applied to liquids other than the water and the urea solution which were mentioned in the present description. This method is not limited to the field of automobiles. It is more particularly intended for vehicles, and could also be used on motorbikes, boats, etc.

Of course, the invention is not restricted to the preferred embodiment described hereinabove by way of illustrative and nonlimiting example. It also relates to the variant embodiments within the competence of the person skilled in the art. The parameters given are indicative and must of course be adapted according to the sensors preferably already present. Parameters may be added or removed.

The invention claimed is:

1. A method for heating liquid in a tank, the method comprising:
    providing at least one Positive Temperature Coefficient (PTC) heating element;
    providing a pulse width modulation regulator;
    measuring parameters including a temperature of the liquid and a voltage applied across terminals of each of the at least one PTC heating element;
    heating the liquid without regulation, with a duty cycle of 1 or 100% of the pulse width modulation setting, insofar as the temperature of the liquid is below a first threshold temperature;
    applying pulse width modulation regulation to an electrical supply to each of the at least one PTC heating element for which the supply voltage exceeds a predetermined threshold insofar as a measured temperature is above a second threshold temperature, said second threshold temperature being determined as a function of measured parameters; and
    determining a modulation duty cycle for modulation of the electrical supply to each of the at least one PTC heating element and transitioning progressively from the duty cycle of 1 to the determined duty cycle.

2. The method as claimed in claim 1, wherein the at least one PTC heating element comprises at least two PTC heating elements mounted in parallel.

3. The method as claimed in claim 2, wherein the first threshold temperature is predetermined as a function of the nature of the liquid contained in the tank.

4. The method as claimed in claim 2, wherein a liquid level is measured,
    wherein the second threshold temperature is determined as a function of the measured liquid level and the temperature of the liquid, and
    wherein the measured temperature compared against the second threshold temperature is a temperature measured downstream of the tank.

5. The method as claimed in claim 2, wherein a liquid level is measured, and
    wherein the duty cycle to be attained is determined as a function of the voltage applied across the terminals of each of the at least one PTC heating element, of the measured liquid level and the temperature of the liquid, from a look-up table.

6. The method as claimed in claim 2, wherein the duty cycle decreases from 100% to the determined modulation duty cycle along a gradient comprised between 0.05 and 0.5% $s^{-1}$.

7. The method as claimed in claim 1, wherein the first threshold temperature is predetermined as a function of the nature of the liquid contained in the tank.

8. The method as claimed in claim 7, wherein a liquid level is measured,
    wherein the second threshold temperature is determined as a function of the measured liquid level and the temperature of the liquid, and
    wherein the measured temperature compared against the second threshold temperature is a temperature measured downstream of the tank.

9. The method as claimed in claim 7, wherein a liquid level is measured, and
    wherein the duty cycle to be attained is determined as a function of the voltage applied across the terminals of each of the at least one PTC heating element, of the measured liquid level and the temperature of the liquid, from a look-up table.

10. The method as claimed in claim 7, wherein the duty cycle decreases from 100% to the determined modulation duty cycle along a gradient comprised between 0.05 and 0.5% $s^{-1}$.

11. The method as claimed in claim 1, wherein a liquid level is measured,
    wherein the second threshold temperature is determined as a function of the measured liquid level and the temperature of the liquid, and
    wherein the measured temperature compared against the second threshold temperature is a temperature measured downstream of the tank.

12. The method as claimed in claim 11, wherein the second threshold temperature is determined from a two-entry look-up table.

13. The method as claimed in claim 12, wherein a liquid level is measured, and
    wherein the duty cycle to be attained is determined as a function of the voltage applied across the terminals of each of the at least one PTC heating element, of the measured liquid level and the temperature of the liquid, from a look-up table.

14. The method of claim 11, wherein the temperature measured downstream of the tank is measured downstream of a pump that withdraws liquid from the tank.

15. The method as claimed in claim 11, wherein a liquid level is measured, and
    wherein the duty cycle to be attained is determined as a function of the voltage applied across the terminals of each of the at least one PTC heating element, of the measured liquid level and the temperature of the liquid, from a look-up table.

16. The method as claimed in claim 1, wherein a liquid level is measured, and
    wherein the modulation duty cycle to be attained is determined as a function of the voltage applied across the terminals of each of the at least one PTC heating element, of the measured liquid level and the temperature of the liquid, from a look-up table.

17. The method as claimed in claim 16, wherein the modulation duty cycle to be attained is determined from a three-entry look-up table.

18. The method as claimed in claim 1, wherein the duty cycle decreases from 100% to the determined modulation duty cycle along a gradient comprised between 0.05 and 0.5% $s^{-1}$.

19. A non-transitory computer-readable medium on which is stored a computer program containing instructions for implementing the method as claimed in claim 1 when the program is executed by a processor.

20. An electronic management device for a motor vehicle engine, the electronic management device comprising:
  the non-transient computer-readable medium and the processor of claim 19.

\* \* \* \* \*